(12) United States Patent
Phely et al.

(10) Patent No.: US 9,854,734 B2
(45) Date of Patent: Jan. 2, 2018

(54) WHEEL FORMING AN IMPROVED AGRICULTURAL TOOL

(71) Applicant: OTICO, Chalmaison (FR)

(72) Inventors: Olivier Phely, Thenisy (FR); Denis Piou, Villeblevin (FR)

(73) Assignee: OTICO, Chalmaison (FR)

( * ) Notice: Subject to any disclaimer, the term of this patent is extended or adjusted under 35 U.S.C. 154(b) by 222 days.

(21) Appl. No.: 14/617,033

(22) Filed: Feb. 9, 2015

(65) Prior Publication Data
US 2015/0223388 A1  Aug. 13, 2015

(30) Foreign Application Priority Data

Feb. 10, 2014 (FR) ..................................... 14 51001

(51) Int. Cl.
| | | |
|---|---|---|
| *A01C 7/20* | (2006.01) | |
| *B60B 3/08* | (2006.01) | |
| *A01C 5/06* | (2006.01) | |
| *B60B 25/00* | (2006.01) | |
| *B60B 5/02* | (2006.01) | |

(52) U.S. Cl.
CPC .............. *A01C 7/205* (2013.01); *A01C 5/068* (2013.01); *B60B 25/006* (2013.01); *B60B 5/02* (2013.01); *B60B 2900/113* (2013.01); *B60B 2900/115* (2013.01); *B60B 2900/325* (2013.01); *B60B 2900/3312* (2013.01)

(58) Field of Classification Search
CPC ....... A01B 15/00; A01B 29/043; A01C 5/068; A01C 7/205; A01C 5/065; B60B 3/002; B60B 3/08; B60B 5/02; B60B 23/10; B60B 25/002; B60B 25/04; B60B 27/0005; B60B 25/006

USPC .......... 111/194; 172/519, 538, 133; 152/453, 152/454, 456, 523; 301/64.303, 64.305

See application file for complete search history.

(56) References Cited

U.S. PATENT DOCUMENTS

| | | | |
|---|---|---|---|
| 921,557 A | 5/1909 | Mussetter | |
| 1,282,305 A * | 10/1918 | Simmons | .................. B60B 3/10 301/11.1 |
| 2,152,957 A * | 4/1939 | Fortney | .................. B60B 25/04 301/64.303 |

(Continued)

OTHER PUBLICATIONS

French Preliminary Search Report dated Oct. 21, 2014 in French Application 14 51001, filed on Feb. 10, 2014 (with English Translation of Categories of Cited Documents).

(Continued)

*Primary Examiner* — Robert E Pezzuto
(74) *Attorney, Agent, or Firm* — Oblon, McClelland, Maier & Neustadt, L.L.P.

(57) ABSTRACT

A tool for working in fields includes a first flange and a second flange which mount one on the other, forming a wheel body. The first flange includes a central portion, a generally annular peripheral portion and arms which connect the central portion and the peripheral portion to each other. The second flange is homologous to the first flange. In the assembled state, the wheel body has a rim which is formed together by the peripheral portion of the first flange and the homologous peripheral portion of the second flange and a hub which is formed by the central portion of the first flange. The central portion of the second flange receives the hub which is formed by the central portion of the first flange.

9 Claims, 4 Drawing Sheets

(56) References Cited

U.S. PATENT DOCUMENTS

| | | | | | |
|---|---|---|---|---|---|
| 2,731,900 | A | * | 1/1956 | Oehler | A01O 5/068 152/453 |
| 2,848,278 | A | * | 8/1958 | Todd | B60B 3/08 152/327 |
| 4,733,730 | A | * | 3/1988 | Murray | A01O 5/068 111/135 |
| 5,533,793 | A | * | 7/1996 | Walker | B60B 3/002 152/453 |
| 6,295,939 | B1 | * | 10/2001 | Emms | A01O 5/068 111/194 |
| 2010/0107946 | A1 | | 5/2010 | Cooney et al. | |

OTHER PUBLICATIONS

U.S. Appl. No. 14/617,086, filed Feb. 9, 2015, Phely.
U.S. Appl. No. 14/617,123, filed Feb. 9, 2015, Phely.

* cited by examiner

WHEEL FORMING AN IMPROVED AGRICULTURAL TOOL

BACKGROUND OF THE INVENTION

Field of the Invention

The invention relates to agricultural tools and more particularly tools comprising mainly one or more wheels.

In tools of this type, the wheel(s) is/are generally used to work the soil. The wheels may operate alone or in conjunction with other portions of the tool.

In the case of a sowing machine, for example, the tool comprises a portion which is provided to open a furrow in the soil, typically a ploughshare, a disc or a tooth, and one or more wheel(s) in order to close the furrow and/or to pack the earth after the seeds have been deposited at the bottom of the furrow.

Some tools, such as the above-mentioned sowing machine, also comprise so-called "depth control" wheels which control the working depth of the remainder of the tool. In the case of a tool comprising a ploughshare, for example, depth control wheels are mounted so as to be fixedly joined to the ploughshare so that, whilst travelling over the ground, the wheels retain the active portion of the ploughshare at a substantially constant depth.

Most often, the wheels with which agricultural tools are provided are intended to travel on the ground. They thus comprise a tire which is mounted around a portion of the wheel which forms the body thereof.

In order to prevent the tire from becoming disconnected from the wheel body during work, the portion of the wheel body which forms the rim is formed in a particular manner. This results in generally complex forms which complicate the production of the wheel body and also the mounting of the tire thereon.

That is the reason for which the wheels often comprise two similar flanges which are mounted one on the other in order to form the body of the wheel. The flanges are assembled one on the other by means of one of the main faces thereof, with the tire being enclosed.

Description of Related Art

In FR 2933903, the Applicant proposed an innovative wheel, whose shape of the wheel body prevents the tire from becoming detached from the rim during operation, including under extreme conditions. The body in question is formed by the mutual assembly of two similar flanges in a state face to face.

When they are used as tools, the wheels are generally subjected to great loads during operation.

In some cases, in particular when a sowing machine is provided therewith, the orientation of the wheel in the machine does not correspond to the advance direction of the machine: it is often the case that the wheel is inclined to a great extent in relation to the advance direction. Furthermore, the wheel may be inclined in relation to the vertical relative to the ground. During operation, this results in very great stress on the wheel body.

In order to ensure the rotation of the wheel about an axle, the occurrences of friction between the hub and the axle must be reduced, for example, by a bearing being received in the wheel body. The Applicant has established that the insertion of the wheel body around an axle and/or the insertion of a bearing into the hub may be difficult or become impossible during use of the wheel. That risk is all the greater if the adjustment of the hub in relation to the axle and/or the bearing in relation to the hub is particularly precise and the tolerances are small. That risk is aggravated when the operating conditions are severe and the stress undergone are great, as in the case of the sowing machine described above.

An objective of the Applicant is to improve the situation.

BRIEF SUMMARY OF THE INVENTION

The Applicant proposes a machine tool of the type comprising a first flange and a second flange which are mounted one on the other, forming a wheel body. The first flange comprises a central portion, a generally annular peripheral portion and arms which connect the central portion and the peripheral portion to each other. The second flange is homologous to the first flange. In the assembled state, the wheel body has a rim which is formed together by the peripheral portion of the first flange and the homologous peripheral portion of the second flange and a hub which is formed by the central portion of the first flange. The central portion of the second flange receives the hub which is formed by the central portion of the first flange.

Such a tool has better robustness. The service-life thereof is increased. The maintenance operations for changing the bearing of the tool are made easier.

The tool may have the following optional features, taken alone or in combination with each other:

the central portion of the first flange is configured so as to retain therein a bearing which is orientated so as to be coaxial with a main axis of the wheel body. A bearing may thus be inserted into the tool before the tool is fixed to an axle. The bearing may comprise, for example, a standard roller bearing. The adequate positioning of the bearing may be independent of the second flange, the central portion of the first flange is configured so as to allow a translation movement along a main axis of the wheel body of a bearing which is received in the central portion of the first flange. The bearing may be inserted and removed axially in the central portion, for example, in order to be changed during maintenance, without the alignment thereof being compromised, the central portion of the first flange comprises an axial stop which is configured so as to limit a translation movement in accordance with a main axis of the wheel body of a bearing which is received in the central portion of the first flange. The axial positioning of the bearing may thus be predefined by the stop. Nevertheless, fine adjustment remains possible for a specific application, for example, with a washer being interposed, the central portion of the second flange forms an axial stop limiting a translation movement in accordance with a main axis of the wheel body of a bearing received in the central portion of the first flange. The axial positioning of the bearing may thus be predefined by the stop. Nevertheless, fine adjustment remains possible for a specific application, for example, with a washer being interposed. When each of the two flanges comprises an axial stop, the bearing is retained in a predefined axial space. Furthermore, the bearing is better protected from the external environment, the tool further comprises a fitted component which is formed so as to be fixed to the wheel body, enclosing a bearing which is received in the central portion of the first flange. The bearing is retained in a predefined axial space. The bearing is better protected from the external environment. The bearing may be released from its housing by disassembling the fitted component, for example, in order to be changed during maintenance. That release is possible whether the second flange and the first flange are in the assembled or non-assembled state, the central portion of the second flange comprises a ring which connects an end of each of the arms of the second flange to each other, the ring being adjusted around the hub formed by the central portion of the first flange during the assembly of the first flange and the second flange one on the other. The centering of the second flange about the hub of the first flange is thus improved. The risk of mutual misalignment of the two flanges is limited, the first flange and the second flange are constructed from two different materials. Thus, the mechanical properties of each of the materials are better adapted to the particular functions of each of the two flanges, the first flange is produced from a plastics material. The first flange is thus light and inexpensive, the second flange is produced from metal. The second flange has good mechanical strength, in particular impact resistance. The second flange may thus form a protection shield for the first flange and for the portions of the wheel body which it covers. This is particularly advantageous in the event of small stones being thrown during operation or accumulation and hardening of earth in movable portions of the tool, the hub comprises at the center thereof a through-hole in accordance with a main axis of the wheel body. The hole comprises at least two substantially cylindrical portions which have different diameters and which are connected by an annular shoulder. The shoulder may thus form an axial stop by means of cooperation with a corresponding surface of a bearing which is received in the hole.

BRIEF DESCRIPTION OF THE DRAWINGS

Other features, details and advantages of the invention will be appreciated from a reading of the following detailed description and the appended drawings, in which.

DETAILED DESCRIPTION OF THE INVENTION

The drawings and the description below mainly contain elements of a specific nature. Therefore, they may not only be used to better understand the present invention, but may also contribute to the definition thereof, where applicable.

Figure 1:
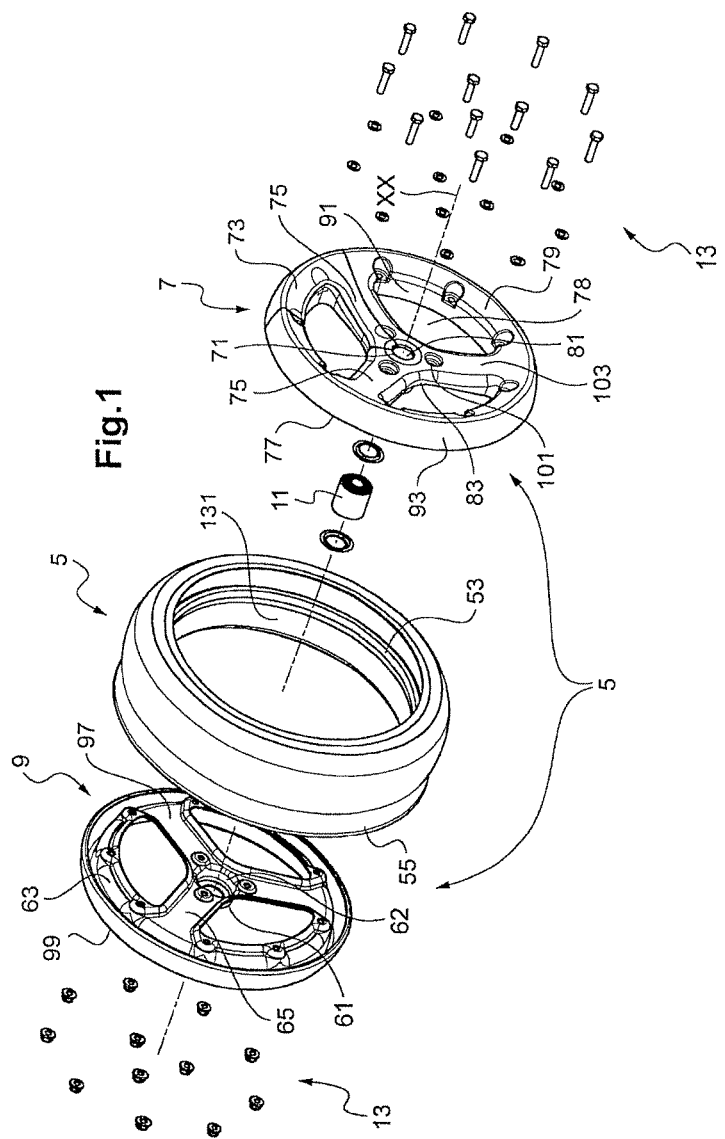
FIG. 1 is an exploded, perspective view of a tool according to the invention.
Figure 2:
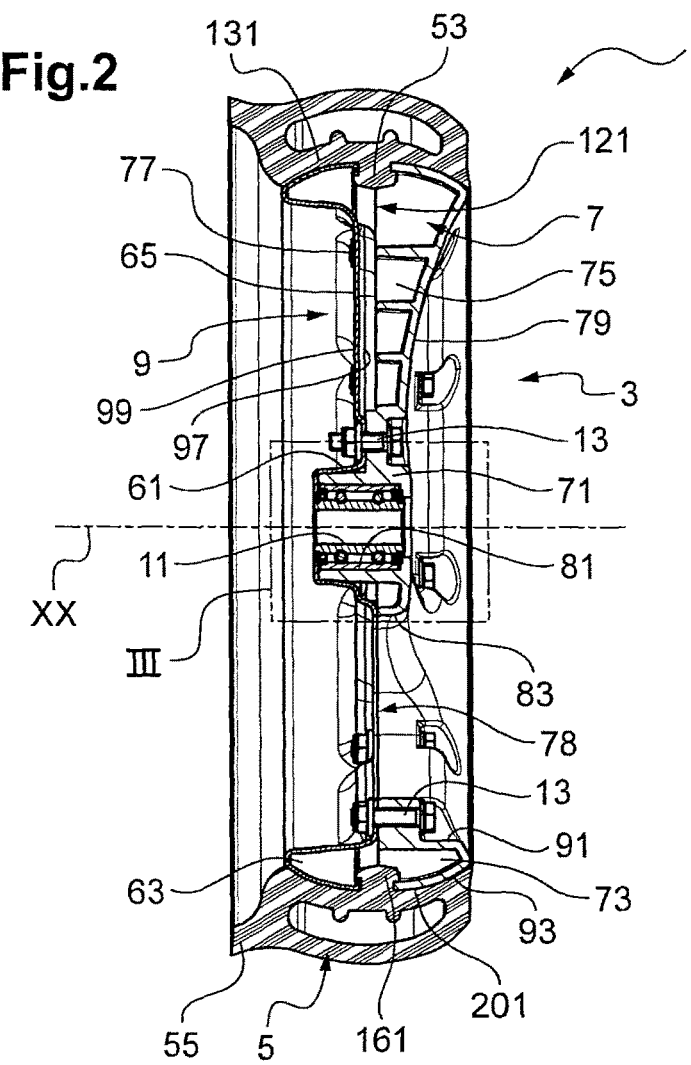
FIG. 2 is a cross-section of the tool of FIG. 1.
Figure 3:
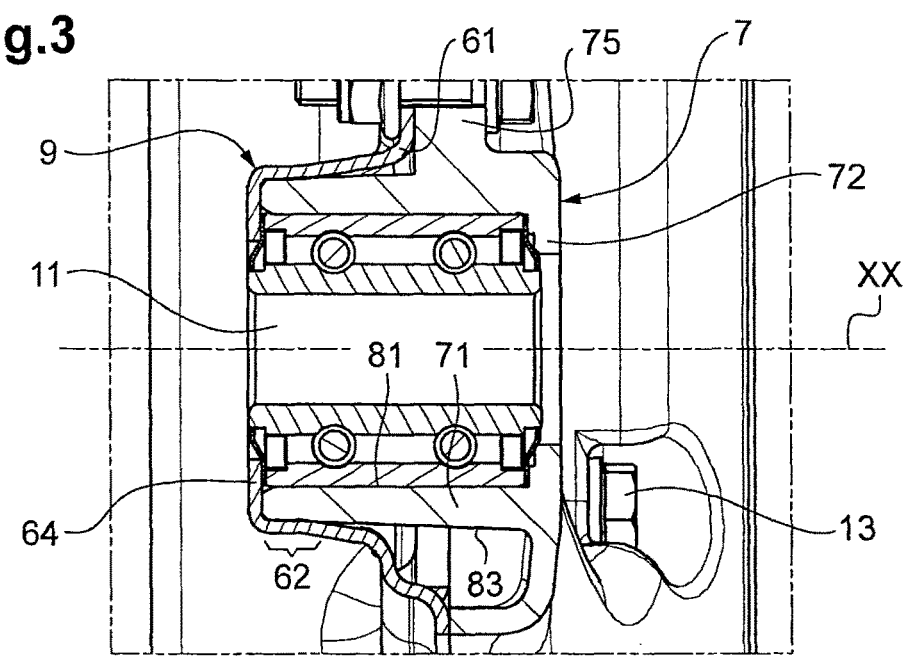
FIG. 3 shows a detail III of FIG. 2.

FIGS. 1 to 3 show a field working tool in the form of a wheel 1. The wheel 1 comprises a wheel body 3, around which a tire 5 is mounted.

In the remainder of the description, the term "body" or "wheel body" is used to refer to the practically non-deformable portion of the wheel as opposed to the deformable portion which the tire constitutes. The term "rim" or "wheel rim" is used to refer to the portion which is located at the periphery of the wheel body and which is intended to support the tire. The remainder of the wheel body may be referred to as the "disc", "wheel disc", "dish" or "wheel dish". In other words, the wheel body is constituted by the rim and the wheel disc. In this instance, the term "rim" is not intended to refer to the whole of the wheel body unlike the use, which is incorrect, which may be made thereof generally.

The wheel body 3 is formed by a first flange 7 and a second flange 9 which are generally circular. The first flange 7 and the second flange 9 which are illustrated separately in FIG. 1 are assembled one on the other in order to form the wheel body 3 as illustrated in FIGS. 2 and 3.

The first flange 7 and the second flange 9 each have a center axis or axis of revolution. Those center axes are aligned in the assembled state and coincide with the axis of rotation of the wheel 1 during operation. Those axes are designated XX in the Figures.

The first flange 7 and the second flange 9 each have an internal face 77 and 97, respectively, and an opposing external face 79 and 99, respectively. During the assembly of the first flange 7 and the second flange 9 one on the other, the internal faces 77 and 97 are placed face to face. The external faces 79 and 99 are orientated opposite to each other toward the outer side of the wheel body 3.

The first flange 7 and the second flange 9 are fixed, in this instance in a reversible manner, to each other in order to form the wheel body 3 by means of fixing members. In the example described here, the fixing members comprise screw/nut pairs 13. The screw/nut pairs 13 allow the first flange 7 and the second flange 9 to be held together. In this instance, screw/nut pairs 13 are distributed in accordance with the periphery of the wheel body whilst screw/nut pairs 13 are distributed in the region of the center of the wheel body 3. Instead or in addition, other fixing means may be used, for example, clips or rivets.

The first flange 7 comprises a central portion 71, a peripheral portion 73 and at least one arm 75 which connect(s) the central portion 71 to the peripheral portion 73. In this instance, the first flange 7 comprises three arms 75.

The central portion 71 is generally generated by revolution. In the assembled state, the central portion 71 forms the hub of the wheel 1. The central space of the revolution type shape of the central portion 71 is capable of receiving an axle or an axle stub which are intended to support the wheel 1 so as to rotate freely about the rotation axis XX. The wheel 1 comprises a rotary bearing which is received in the central portion 71, in this instance in the form of a ball bearing 11. In a variant, the ball bearing 11 may be replaced by other types of bearing and more generally by a bearing of a different type, such as a plain bearing, for example.

The central portion 71 has an internal surface 81 which is generally orientated toward the main axis XX and which here forms a hole which is capable of receiving the bearing 11. The central portion 71 has a peripheral external surface 83 which is opposite the internal surface 81.

The peripheral portion 73 is generally of annular form. The peripheral portion 73 is delimited in the direction of the main axis XX by an internal edge and an external edge. The peripheral portion 73 and the central portion 71 are substantially concentric and centered about the main axis XX. The peripheral portion 73 surrounds the central portion 71. In the example illustrated in FIG. 2, the peripheral portion 73 and the central portion 71 are offset relative to each other in the direction of the main axis XX. At the side of the internal face 77 (on the left in FIG. 2), the central portion 71 projects in the direction of the main axis XX in relation to the internal edge of the peripheral portion 73 substantially by half of the length of the central portion 71. At the side of the external face 79 (on the right in FIG. 2), the central portion 71 is arranged so as to be recessed with respect to the external edge of the peripheral portion 73. In a variant, the peripheral portion 73 and the central portion 71 may be substantially coplanar in accordance with a plane perpendicular to the main axis XX.

The peripheral portion 73 has an internal surface 91, or diametrically internal surface, which is generally orientated toward the central portion 71 and an external surface 93, or diametrically external and peripheral surface, opposite the internal surface 91. In this instance, the internal surface 91 has a generally cylindrical form which is interrupted by the arms 75. In this instance, the external surface 93 has a generally annular form with a profile which is rounded and curved in an outward direction.

Each arm 75 has an internal end 101 which is connected to the central portion 71 at the external surface 83 thereof and an external end 103 which is opposite the internal end 101 and which is connected to the peripheral portion 73 at the internal surface 91 thereof. Thus, each arm 75 connects the central portion 71 and the peripheral portion 73 to each other. The arms 75 extend radially. They form radii of the wheel 1.

In this instance, the internal end 101 of each of the arms 75 is connected to the external surface 83 substantially over half of the central portion 71 at the side of the external face 79. The arms 75 have a thickness, in the direction of the main axis XX, which increases in a regular manner from the central portion 71 as far as the external end 103, where it is at a maximum and substantially equal to the thickness of the peripheral portion 73. In this manner, the external end 103 of each arm 75 is substantially aligned with the peripheral portion 73, to which it is connected. The portion of the internal face 77 of the first flange 7 defined by the arms 75 is substantially planar and aligned with the internal edge of the peripheral portion 73. Only the central portion 71 projects therefrom. The portion of the external face 79 of the first flange 7 defined by the arms 75 is substantially concave, in the form of a cup which is centered on the main axis XX.

Spaces 78 are defined between the arms 75 and the internal surface 91 of the peripheral portion 73. The distribution of the arms 75 around the central portion 71 defines the same number of intervening spaces 78. Those spaces 78 are free and extend through in the direction of the main axis XX from the internal face 77 to the external face 79. During operation, the spaces 78 make it easier for debris and mud to be discharged through the first flange 7. The arms 75 and the intervening spaces 78 together form an open disc of a wheel.

The arms 75 are regularly distributed in an angular manner about the main axis XX. In the examples described here, there are three arms which are spaced apart from each other by 120°. That configuration ensures sufficient mechanical strength for the applications envisaged whilst allowing economy of material in relation to a solid disc of a wheel. In variants, the number and/or distribution of the arms 75 may be different.

In the examples described here, the first flange 7 is formed as a monobloc component. The first flange 7 is obtained, for example, by injection molding. In this instance, the first flange 7 is produced from plastics material, for example, polyamide, such as polyamide 6-6, or polypropylene. The first plastics flange 7 has low costs in terms of raw materials and production. Nevertheless, the first flange 7 may also be produced from metal. Thus, the first metal flange 7 has improved resistance to impacts, for example, in the event of stones being thrown during the movement of the machine.

As appears in FIGS. 2 to 6, the first flange 7 may be in the form of a casing which is consolidated by internal reinforcement walls, or ribs, between which multiple cavities are left empty. The ribs confer on the first flange 7 good mechanical strength which is comparable to a solid metal component and/or a solid plastics component. They ensure the necessary mechanical strength with few raw materials. The volume occupied by the first flange 7 is mainly hollow.

Where applicable, the number, distribution and form of the ribs may be adapted in accordance with the mechanical strength desired for the first flange 7. Modeling tools of the finite element type may be used.

The central portion 71 receives the roller bearing 11. During assembly, the roller bearing 11 is mounted coaxially with respect to the main axis XX of the wheel body 3. The roller bearing 11 is retained in this position by means of the housing so that the main axis XX of the wheel body 3 coincides with the rotation axis of the wheel 1 during use.

In particular, the internal surface 81 of the central portion 71 partially defines the housing and is in the form of a cylindrical hole whose diameter corresponds to the diameter of the external cylindrical form of the roller bearing 11.

The length of the internal surface 81, in the direction of the main axis XX, is selected so as to be sufficient to ensure long centering. For example, the length of the internal surface 81 is greater than half of the length of the roller bearing 11. The addition of another piece in order to ensure the centering is unnecessary. In this instance, the length of the housing is substantially equal to the length of the external ring of the roller bearing 11.

In the example of FIG. 3, the central portion 71 of the first flange 7 is configured so as to allow a translation movement of the roller bearing 11 in accordance with the main axis XX in the absence of the second flange 9. In this manner, the roller bearing 11 may be readily inserted into and removed from the housing thereof.

The central portion 71 further comprises an axial stop 72 which is configured so as to limit the translation movement of the roller bearing 11. The axial stop 72 is formed in this instance at the side of the external face 79 of the first flange 7. Consequently, the insertion and removal of the roller bearing 11 may be carried out at the opposite side. The axial stop 72 allows control of the positioning of the roller bearing 11 in relation to the first flange 7. The axial stop 72 may be considered to be a bottom of the housing.

The bottom is adjusted here in order to be in contact with the end of the external ring of the roller bearing 11 whilst leaving a central passage free. In this manner, an axle may project from the external end of the first flange 7 (on the right in FIGS. 2 and 3).

The internal ring of the roller bearing 11 is longer than the external ring and projects into the opening at the bottom of the housing (on the right in FIG. 3). The external ring also projects from the opposite end of the housing (on the left in FIG. 3). In this manner, the introduction of various contaminants which could damage the roller bearing 11, such as dust or earth, is prevented.

The second flange 9 is homologous to the first flange 7. The second flange 9 comprises a central portion 61, a peripheral portion 63 and arms 65. In order not to complicate the Figures, the surfaces of the second flange 9 which are homologous to the surfaces 81, 83, 91, 93 of the first flange 7 are not indicated. The spaces of the second flange 9 which are homologous to the spaces 78 of the first flange 7 are not indicated. The second flange 9 operates in a similar manner to the first flange 7, with the exception of the aspects described below.

The central portion 61 of the second flange 9 differs from the central portion 71 of the first flange 7 in that it does not form a hub in the assembled state of the two flanges 7, 9. The central space of the central portion 61 of the second flange 9 is capable of receiving the hub formed by the central portion 71 of the first flange 7.

In the examples illustrated here, the central portion of the second flange 9 comprises a ring 62. The ring 62 connects the internal end of each of the arms 65 of the second flange 9 to each other. During the assembly of the first flange and the second flange 9 one on the other, the ring 62 is adjusted around the hub formed by the central portion 71 of the first flange 7. The ring 62 is optional but allows an improvement in the mutual centering of the first flange 7 and the second flange 9. The ring 62 generally reinforces the resistance of the wheel body 3. The ring 62, in at least partially surrounding and covering the hub, protects it from the environment. For example, the ring 62 protects the hub and the roller bearing 11 which is received therein from the impacts resulting from small stones being thrown during operation. The ring 62 also protects from stress and friction which may result from the accumulation of dried earth near the moving portions of the wheel 1. That protection is particularly effective when the ring 62 is produced from metal. In a variant, the ring 62 may not be provided, and the internal ends of each of the arms 65 may move into abutment around the central portion 71 of the first flange 7, independently of each other.

In the example illustrated in FIG. 3, the peripheral portion 63 of the second flange 9 is in the form of a ring which has a hollow cross-section and which is generally triangular. One of the sides of the triangle-like form carries the external surface which is homologous to the external surface 93 of the peripheral portion 73 of the first flange 7. The external surface has a generally circular form with a profile which is rounded and curved toward the outer side.

In the example illustrated in FIG. 3, the arms 65 have a substantially planar form in the direction of the main axis XX. The arms 65 of the second flange 9 and the arms 75 of the first flange 7 are substantially aligned in pairs in the direction of the main axis XX by rotational indexing of the two flanges 7, 9 relative to each other. The spaces 78 of the first flange 7 and the homologous spaces of the second flange are aligned in pairs and remain through-spaces after assembly of the two flanges 7, 9. The wheel body 3 has an open-disc wheel.

In the examples described here, the second flange 9 is formed as a monobloc component. The second flange 9 is obtained by stamping from a metal sheet. In particular, the peripheral portion 63 is obtained by the peripheral portion of the metal sheet being bent about itself, which confers on the peripheral portion 63 a collar-like form or peripheral rim. In a variant, the second flange 9 may be obtained by molding or drawing. In this instance, the second flange 9 is produced from metal, for example, steel. In a variant, aluminum may be used. The second flange 9 has high mechanical strength. Nevertheless, the second flange 9 may also be produced from a plastics material, for example, similar to the one of the first flange 7.

The first flange 7 of plastics material has a low production cost while the second flange 9 of metal confers on the wheel body 3 the mechanical strength necessary for working in fields. Nevertheless, the two flanges 7, 9 may both be produced from metal, for example, when the mechanical stress anticipated are severe, or both from plastics material, for example, when the mechanical stress anticipated are moderate. The general configuration of the wheel body 3 formed by the first flange 7 and the second flange allows adaptation of the mechanical behavior of the wheel body 3, adapting the materials used without affecting the general configuration of the wheel body 3. In a variant, the first flange 7 and/or the second flange 9 may be produced by assembling a plurality of components rather than by means of a monobloc component. For example, the peripheral portion 73 and/or the peripheral portion 63 may be formed from a plurality of annular sections.

In the embodiment of FIGS. 1 to 3, the central portion 61 of the second flange 9 comprises a covering portion 64. The covering portion 64 is formed in this instance by an extension of the ring 62 toward the external face 99 of the second flange 9 which is bent substantially in a radial direction toward the main axis XX. The covering portion 64 covers the end of the central portion 71 of the first flange 7. The covering portion 64 forms a radial projection toward the center in relation to the internal surface 81, defining the housing for the roller bearing 11. In other words, the covering portion 64 partially closes the housing for the roller bearing 11. The covering portion 64 of the central portion 61 of the second flange 9 thus forms an axial stop which limits the translation movement of the roller bearing 11 in the housing thereof. The assembly of the two flanges 7, 9 encloses the roller bearing 11 in the housing thereof. The covering portion 64 is in this instance adjusted in order to be in contact with the external ring of the roller bearing 11 whilst leaving a central passage free. In this manner, an axle may project from the external side of the second flange 9 (on the left in FIGS. 2 and 3).

The covering portion 64 also ensures protection of the hub as described above with regard to the ring 62. The covering portion 64 forms a protection shield for the hub. By at least partially covering the hub, the covering portion 64 protects the hub from the environment. For example, the covering portion 64 protects the hub and the roller bearing 11 which is received therein from the impacts resulting from small stones being thrown during operation. The covering portion 64 also protects from stress and friction which may result from the accumulation of dried earth near the moving portions of the wheel 1.

The second flange 9 does not retain the roller bearing 11 radially and therefore does not contribute to the centering thereof. The second flange 9 only contributes optionally to the axial blocking thereof. During operation, the second flange 9 does not cooperate directly with the axle. The forces to which the peripheral portion 63 of the second flange 9 are subjected are transmitted to the central portion 71 of the first flange 7 via the arms 65 of the second flange 9.

Figure 4:
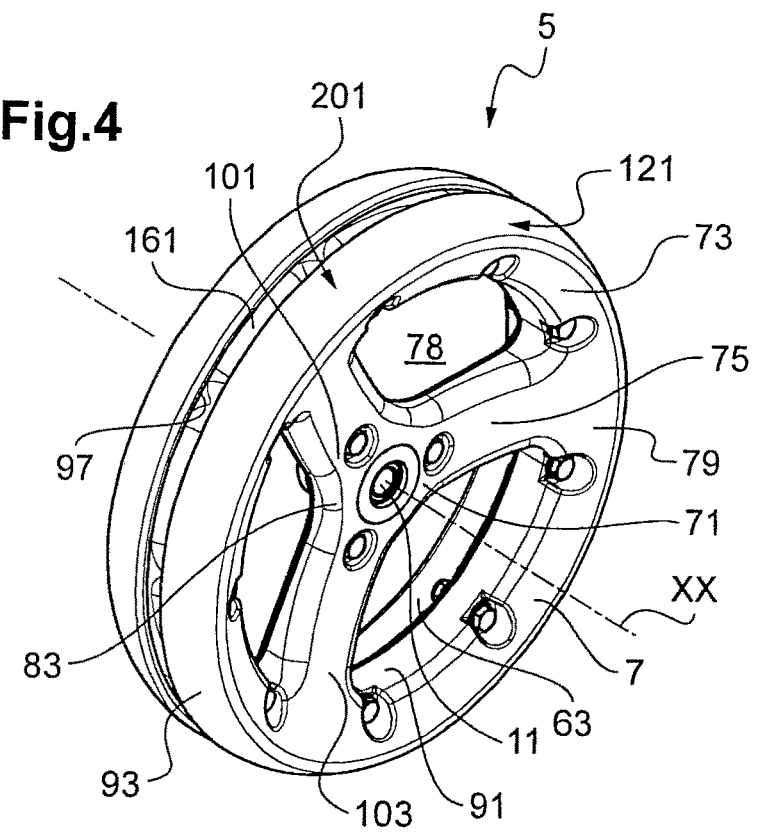
FIG. 4 is a perspective view of a tool according to the invention without any tire.
Figure 5:
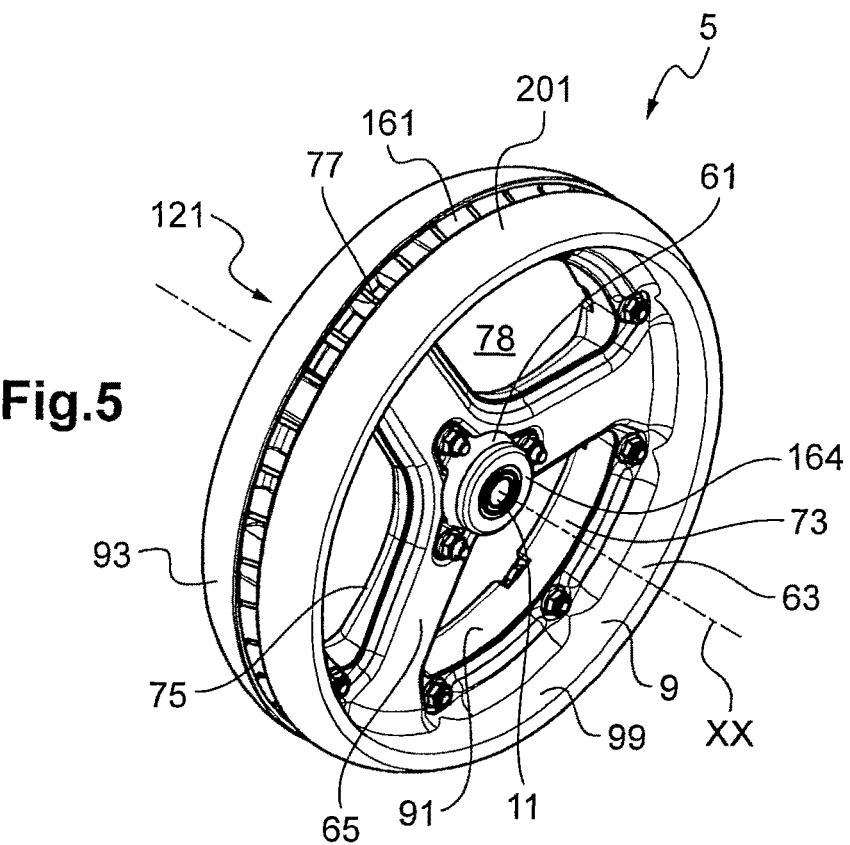
FIG. 5 is a view of the tool of FIG. 4 from another point of view.

The embodiment of FIGS. 4 and 5 is similar to the one of FIGS. 1 to 3. The functionally identical portions therein have the same reference numerals. The covering portion 64 of the second flange 9 is not provided therein. The wheel 1 comprises a fitted component 164 or cup. The fitted component 164 is formed so as to be fixed to the wheel body 3, enclosing the roller bearing 11 which is received in the central portion 71 of the first flange 7. The fitted component 164 functions in a similar manner to the covering portion 64 of the embodiment of FIGS. 1 to 3. In the embodiment of FIGS. 4 and 5, the roller bearing 11 may be removed from the housing thereof, for example, in order to be replaced during maintenance, without it being necessary to disassemble the two flanges 7, 9. The disassembly of the fitted component 164 is sufficient for opening the housing and releasing the roller bearing 11.

The fitted component 164 may be produced by a metal sheet being deformed. During operation, the fitted component 164 ensures the axial retention of the roller bearing 11 and is subjected to moderate forces. The fitted component 164 may be produced from a less high-grade and less expensive material than the flanges 7, 9, for example, sheet metal.

In variants, the hub formed by the central portion 71 of the first flange 7 comprises at the center thereof a through-hole in accordance with the main axis XX comprising at least two substantially cylindrical portions which have different diameters and which are connected by an annular shoulder. The roller bearing 11 thus has an external form which is adapted so that the annular shoulder forms an axial stop for the roller bearing 11.

Once the two flanges 7, 9 have been mutually assembled, the wheel body 3 has a rim 121 which is formed together by the peripheral portion 73 of the first flange 7 and the homologous peripheral portion 63 of the second flange 9. Thus, the rim 121 has an external surface which is formed together by the external surface 93 of the peripheral portion 73 of the first flange 7 and by the homologous external surface of the second flange 9. That external rim surface forms a seat 201 of a wheel body 3. The seat 201 receives the tire 5.

Once the tire 5 has been fitted on the rim 121, the first flange 7 and the second flange 9 support the tire 5, each one substantially by a half here. The surface-area of the external surface 93 of the first flange 7 covered by the tire 5 is substantially equivalent to the surface-area of the homologous external surface of the second flange 9 covered by the tire 5. The first flange 7, the second flange 9 and the tire 5 are mutually configured so that the radial force applied by the tire 5 which surrounds the wheel body 3 is substantially distributed in an equivalent manner over the two flanges 7, 9. Neither the first flange 7 nor the second flange 9 has the sole function of blocking the tire 5 in the direction of the main axis XX. In a variant, the distribution of the forces may be unbalanced, for example, up to a ratio of 4 to 1.

The tire 5 comprises a sole 131 in abutment with the seat 201 of the rim 121. The configurations of the sole 131, on the one hand, and the seat 201, on the other hand, are selected so as to correspond, substantially with form-fitting correspondence. The tire 5 is retained around the wheel body 3. The risk of accidental detachment from the rim is low even under difficult conditions.

In the examples described here, the tire 5 is a tire of the semi-hollow type. The tire 5 is of the non-inflatable type. The internal space between the sole 131 and the running tread profile is in fluid communication with the exterior via an opening which is not illustrated. This allows greater deformation of the tire 5 during operation, thereby making it easier to remove mud.

In the embodiments illustrated in the Figures, the seat 201 has a diameter which varies in the direction of the main axis XX. The seat 201 has a form which is not strictly cylindrical. In the region of the interface between the first flange 7 and the second flange 9, that is to say, in the region of the internal faces 77, 97, the diameter of the seat 201 is substantially different from the diameter of the seat 201 in the region of the opposing faces, that is to say, the external faces 79, 99. This can be seen in FIG. 2 as a cross-section. Thus, portions of the seat 201 oppose the axial movement of the tire 5. The risk of accidental detachment from the rim is particularly small. The addition of a specific component forming a blocking wall is unnecessary.

In the embodiments of the Figures, in the region of the interface between the first flange 7 and the second flange 9, the diameter of the seat 201 is greater than the diameter of the seat 201 in the region of the opposing faces of the flanges 7, 9 with the exception of a groove 161. The seat 201 thus has a generally convex form. That configuration allows, for example, the use of tires whose sole 131 is concave and covers a convex seat 201 by partially surrounding it. Such tires are described, for example, in FR 2 933 903.

In a variant, in the region of the interface between the first flange 7 and the second flange 9, the diameter of the seat 201 is less than the diameter of the seat 201 in the region of the opposing faces. The seat 201 thus has a generally concave form. The seat 201 has surfaces which oppose the axial displacement of the tire 5.

In the embodiments of the Figures, the peripheral portion 73 of the first flange 7 and the peripheral portion 63 of the second flange 9 are mutually formed so that the assembly thereof defines the groove 161. The groove 161 extends substantially over the circumference of the wheel body 3, at the interface of the peripheral portion 73 of the first flange 7 and the peripheral portion 63 of the second flange 9. The groove 161 is capable of receiving a corresponding bead 53 of the tire 5. The retention of the tire 5 around the wheel body 3 is further improved.

In each of the embodiments illustrated in the Figures, the wheel body 3 is asymmetrical. In particular, the hub formed by the central portion 71 of the first flange 7 is offset in relation to the center of the wheel body 3 in accordance with the main axis XX. The hub of the first flange 7 at least partially projects into the internal space defined by the annular form of the peripheral portion 63 of the second flange 9. That feature is optional but allows better balancing of the tool 1 once it is installed on the remainder of the machine.

The tire 5 as illustrated in FIG. 2 has an asymmetrical profile. The sole 131 and the seat 201 each have a plane of symmetry perpendicular to the main axis XX. The portion of the tire 5 opposite the sole 131, the running tread profile, is asymmetrical. The running tread profile has a lip 55. The lip 55 projects from the tire 5 substantially in the direction of the main axis XX, toward the outer side, at the side of the external face 99 of the second flange 9. The lip 55 extends substantially over the circumference of the tire 5. Such a wheel provided with a tire 5 having a lip 55 is provided to be installed on a machine as schematically illustrated in FIGS. 6A to 6D.

FIGS. 6A to 6D partially illustrate a sowing machine 500, in which tools 1 similar to the tool of FIGS. 1 to 5 each cooperate with a disc 501. Thus, the tool 1 forms a depth control wheel. The tool 1 can rotate freely but is fixedly joined to the disc 501 in a substantially vertical direction. In this manner, even in the presence of irregularities in a field, the disc 501 operates at a substantially constant depth in relation to the surface of the ground. Furthermore, the respective axes of the tool 1 and the disc 501 are offset relative to each other. During the advance movement of the sowing machine 500, the lip 55 of the tool 1 scrapes against one of the faces of the disc 501, thereby cleaning from it any mud and debris which could be fixed thereto. In this example of an application of the tool 1, one of the two faces of the tool 1 is inaccessible during operation: the side of the tool 1 corresponding to the external face 99 of the second flange 9 is not very accessible because of the presence of the disc 501.

Figure 6A:
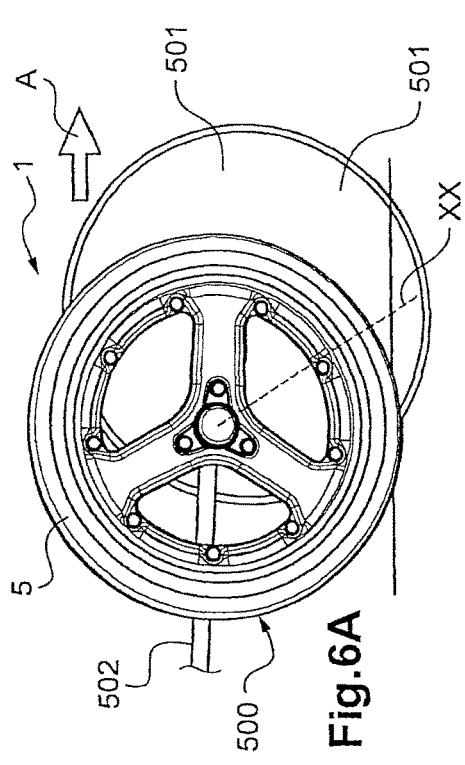
FIGS. 6A to 6D show an agricultural machine on which two tools according to the invention are mounted.
Figure 6D:
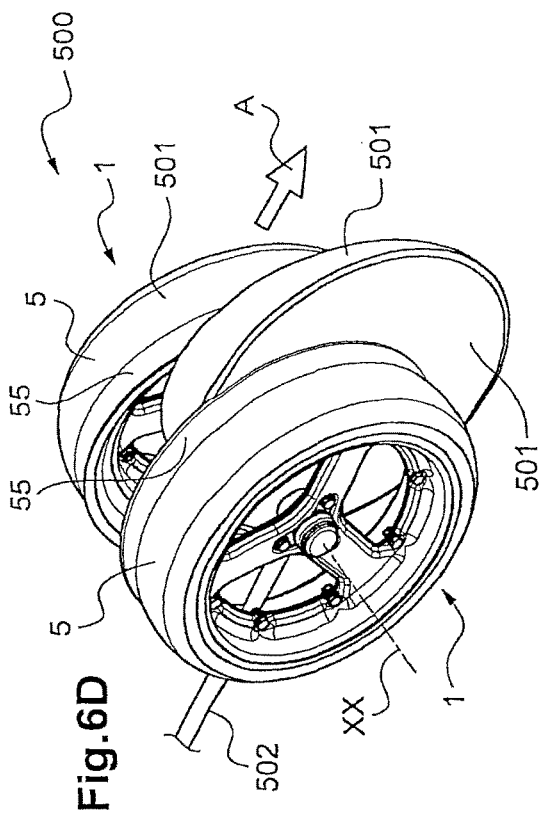
Figure 6B:
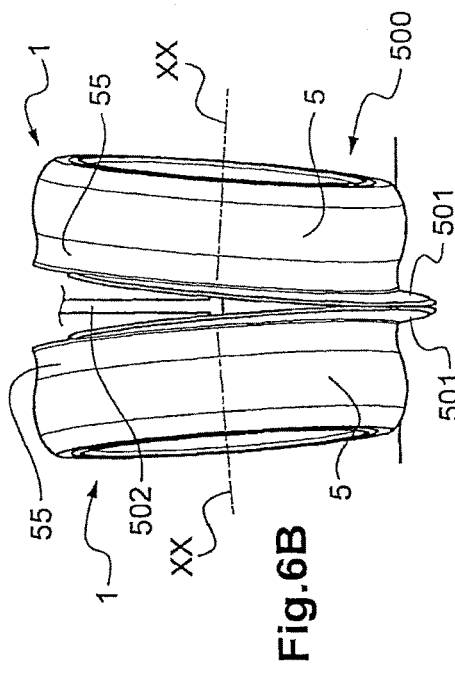

In FIG. 2, the lip 55 of the tire 5 is located at the side of the second flange 9. In this configuration, a large free space is provided inside the wheel 1 at the side of the lip 55. The free space particularly allows, partially in the internal space defined by the tire 5, an arm 502 of an agricultural machine frame which supports an axle provided substantially in accordance with the main axis XX, to be received. FIGS. 6A to 6B show an example of such an assembly. In this example, the arm 502 of the frame must be able to extend between the main axis XX in the region of the roller bearing 11 and the periphery of the wheel 1. The arm 502 of the frame must further not impair the operation of the disc 501 which is arranged in contact with a portion of the lip 55 and which partially closes a face of the wheel 1. In variants, the lip 55 may be arranged at the same side of the wheel 1 as the first flange 7, in a state facing the disc 501.

As can be seen in the front view of FIG. 6B, that is to say, orientated toward the rear in the direction of advance of the sowing machine 500, the sowing machine 500 has a so-called "V-like" configuration. Two discs 501 cooperate in order to dig a furrow in the ground. The two discs 501 are mutually symmetrical in relation to a vertical plane which extends in the advance direction illustrated by the arrow A. The discs 501 are not arranged in the vertical state but are instead orientated partially toward the ground. They form, for example, an angle of approximately 5° with the vertical. A wheel 1 cooperates with each of the discs 501. The two wheels 1 have an orientation similar to that of the discs 501, although the value of the angle may be different.

Figure 6C:
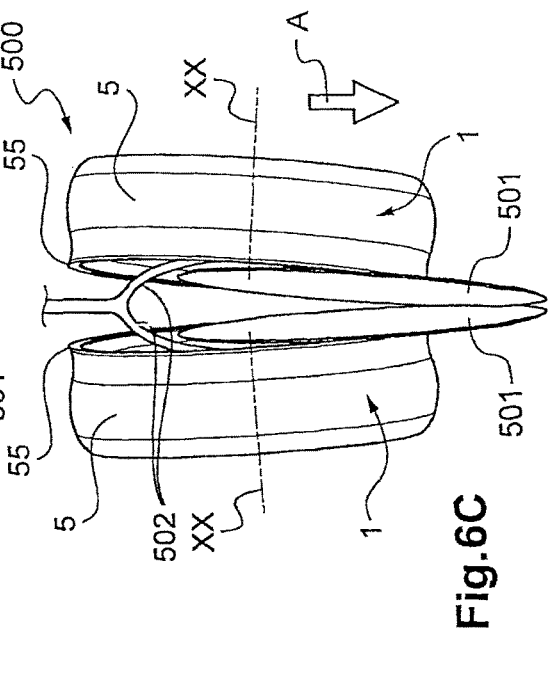

As may be seen in the plan view of FIG. 6C, the sowing machine 500 further has a "V-like" configuration in accordance with another orientation in space. The two discs 501 also form an angle with the advance direction of the sowing machine 500. In this instance, the angle is also approximately 5°. The wheels 1 have an orientation similar to that of the discs 501, although the value of the angle may be different.

As a result of those specific orientations, the loads to which the wheels 1 are subjected and which result from the resistance of the terrain and friction are great. They are greater than those to which an identical wheel 1, the rotation axis XX of which would be substantially perpendicular to the advance direction and/or horizontal, would be subjected. The stress tend to become concentrated in the region of the hub and the connection to the axle. The improvements provided by the invention therefore have a specific advantage for agricultural tools having a similar configuration.

In conventional wheels, the bearing is positioned in a straddling manner in a hole in two portions which are provided in respective flanges. The centering of the bearing is complex as a result of alignment errors of the two flanges. During assembly and operation, that alignment tends to be compromised by any displacement of the two half-housings in relation to each other, which displacements are caused, for example, by stress and impacts.

As a result of the monobloc nature of the housing in the tool according to the invention, the centering of the bearing is non-sensitive to any relative displacements between the two flanges. The hole of the housing retains its internal form whatever the play between the two flanges. Such a tool has improved robustness whilst having an ease of disassembly and a reasonable mass and cost.

The production and assembly tolerances may be increased, in particular with regard to the assembly of the two flanges with each other.

The invention is not limited to the examples of tools described above, merely by way of example, but also includes all the variants which the person skilled in the art may envisage within the scope of the appended claims.

The invention claimed is:

1. A tool for working in fields, said tool comprising:
a first flange and a second flange which mount on each other, forming a wheel body having a main axis, the wheel body including a rim and a hub,
the first flange comprises a central portion, a generally annular peripheral portion and arms which connect the central portion and the peripheral portion to each other,
the second flange is homologous to the first flange,
in an assembled state, the rim is formed together by the peripheral portion of the first flange and the homologous peripheral portion of the second flange and the hub is formed by the central portion of the first flange while the central portion of the second flange receives the hub formed by the central portion of the first flange,
the central portion of the first flange comprising a housing for a bearing having an external cylindrical form, the housing being formed as a cylindrical hole having a diameter that corresponds to a diameter of said external cylindrical form, and the central portion of the first flange is configured so as to retain therein the bearing coaxially with said main axis while allowing a translation movement of the bearing along said main axis, and
the central portion of the second flange forms an axial stop which limits said translation movement of the bearing.

2. The tool according to claim 1, wherein the central portion of the first flange comprises an axial stop which is configured so as to limit said translation movement of the bearing.

3. The tool according to claim 1, further comprising a fitted component which is formed so as to be fixed to the wheel body, enclosing the bearing.

4. The tool according to claim 1, wherein the second flange further comprises arms and the central portion of the second flange comprises a ring which connects an end of each of the arms of the second flange to each other, the ring being adjusted around the hub formed by the central portion of the first flange during mounting of the first flange and the second flange on each other.

5. The tool according to claim 1, wherein the first flange and the second flange are constructed from two different materials.

6. The tool according to claim 1, wherein the first flange is produced from a plastics material.

7. The tool according to claim 1, wherein the second flange is produced from metal.

8. The tool according to claim 1, wherein the hub comprises at the center thereof a through-hole in accordance with a main axis of the wheel body, the through-hole comprising at least two substantially cylindrical portions which have different diameters and which are connected by an annular shoulder.

9. The tool according to claim 1, wherein the includes an internal ring and an external ring and the internal ring is longer than the external ring and projects into an opening in a bottom of the housing.

* * * * *